US012553580B2

(12) United States Patent
Kulkarni et al.

(10) Patent No.: US 12,553,580 B2
(45) Date of Patent: Feb. 17, 2026

(54) CORDLESS WORK LIGHT

(71) Applicant: MILWAUKEE ELECTRIC TOOL CORPORATION, Brookfield, WI (US)

(72) Inventors: Ameya Sanjay Kulkarni, Brookfield, WI (US); Seamus J. Herson, Wauwatosa, WI (US); Richard M. Schieber, Milwaukee, WI (US); Brandon L. Yahr, Slinger, WI (US); Benjamin J. Boldt, Milwaukee, WI (US); Ellen M. Owens, Wauwatosa, WI (US); Austin F. de Veer, Lake Orion, MI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/634,051

(22) Filed: Apr. 12, 2024

(65) Prior Publication Data

US 2024/0344673 A1 Oct. 17, 2024

Related U.S. Application Data

(60) Provisional application No. 63/460,925, filed on Apr. 21, 2023, provisional application No. 63/458,705, filed on Apr. 12, 2023.

(51) Int. Cl.
*F21L 4/04* (2006.01)
*F21L 2/00* (2006.01)
(Continued)

(52) U.S. Cl.
CPC *F21L 4/04* (2013.01); *F21L 2/00* (2013.01); *F21V 14/025* (2013.01);
(Continued)

(58) Field of Classification Search
CPC .. F21L 2/00; F21L 4/04; F21V 14/025; F21V 21/0816; F21V 21/0965; F21V 21/0406;
(Continued)

(56) References Cited

U.S. PATENT DOCUMENTS 4,974,130 A * 11/1990 Friedman ............ F21V 23/0414 362/108
9,492,919 B2 * 11/2016 Roehm ............... F21V 33/0084
(Continued)

OTHER PUBLICATIONS

Milwaukee Electric Tool Corp., "M18™ Rover™ Mounting Flood Light," <https://www.milwaukeetool.com/products/2365-20> web page available prior to Apr. 12, 2023, web page accessed on Mar. 24, 2025 (6 pages).
(Continued)

*Primary Examiner* — Laura K Tso
(74) *Attorney, Agent, or Firm* — Michael Best & Friedrich LLP

(57) ABSTRACT

A work light comprising a body, a light panel, a clamp, and a magnet. The body includes a first side, a second side, and an interface to couple to a battery. The light panel is moveably coupled to the first side of the body and is electrically coupled to the interface. The clamp is extendable from the second side of the body and is configured to selectively couple the work light to an external structure. The magnet is supported on the second side of the body.

13 Claims, 8 Drawing Sheets

(51) Int. Cl.

| | |
|---|---|
| ***F21V 14/02*** | (2006.01) |
| ***F21V 21/08*** | (2006.01) |
| ***F21V 21/096*** | (2006.01) |
| ***F21V 21/40*** | (2006.01) |
| ***F21W 131/402*** | (2006.01) |
| ***F21Y 105/16*** | (2016.01) |
| ***F21Y 115/10*** | (2016.01) |

(52) U.S. Cl.
CPC ...... *F21V 21/0816* (2013.01); *F21V 21/0965* (2013.01); *F21V 21/406* (2013.01); *F21W 2131/402* (2013.01); *F21Y 2105/16* (2016.08); *F21Y 2115/10* (2016.08)

(58) Field of Classification Search
CPC ............. F21Y 2105/16; F21Y 2115/10; F21W 213/402
USPC ........................................................ 362/249.1
See application file for complete search history.

(56) References Cited

U.S. PATENT DOCUMENTS

| | | | | |
|---|---|---|---|---|
| 10,018,337 | B2 | 7/2018 | Dorman et al. | |
| 2004/0114357 | A1* | 6/2004 | Dalton | F21V 21/0885 362/269 |
| 2021/0156528 | A1* | 5/2021 | Wenzel | F21L 4/08 |

OTHER PUBLICATIONS

Milwaukee Electric Tool Corp., "M18™ Rover™ Mounting Flood Light," Operator's Manual dated Sep. 2017 (2 pages).

* cited by examiner

CORDLESS WORK LIGHT

CROSS-REFERENCE TO RELATED APPLICATIONS

This application claims priority to U.S. Provisional Patent Application No. 63/458,705, filed on Apr. 12, 2023, and to U.S. Provisional Patent Application No. 63/460,925, filed on Apr. 21, 2023, the entire contents of all of which are incorporated herein by reference.

FIELD OF THE INVENTION

The present invention relates to cordless work lights configured to illuminate the surrounding area.

BACKGROUND OF THE INVENTION

On worksites, cordless work lights are typically used to illuminate the surrounding area. In some instances, it might be desirable for the cordless work lights to be easily portable and quick to set up.

SUMMARY OF THE INVENTION

In one aspect, the present disclosure provides a work light including a body, a light panel, a clamp assembly, and a magnet. The body includes a first side, a second side, and an interface configured to couple to a battery pack. The light panel is moveably coupled to the first side of the body and is electrically coupled to the interface. The clamp assembly is extendable from the second side of the body and is configured to selectively couple the work light to an external structure. The magnet is supported on the second side of the body.

In another aspect, the present disclosure provides a work light including a support structure and a light panel. The support structure includes a frame, a leg, a strut, and an actuator. The frame includes a foot and defines a battery pack compartment configured to receive a battery pack. The leg is moveable relative to the frame between a storage position and a deployed position. The strut is coupled to the leg. The actuator is coupled to the strut and is positioned adjacent the foot of the frame. The actuator is operable to push the strut, which thereby moves the leg from the storage position to the deployed position, when the frame is supported by the foot. The light panel is coupled to the support structure and is electrically coupled to the battery pack compartment.

In another aspect, the present disclosure provides a work light including a cart, a plurality of wheels, a mast supported by the cart, and a light panel. The cart defines a battery compartment configured to receive a battery pack. The plurality of wheels is coupled to the cart to facilitate movement of the cart along a surface. The light panel is coupled to the mast and is electrically coupled to the battery compartment. Additionally, a portion of the light panel is removable from a remainder of the light panel and is usable independently from the reminder of the light panel.

Other aspects of the disclosure will become apparent by consideration of the detailed description and the accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phrascology and terminology used herein is for the purpose of description and should not be regarded as limiting.

DETAILED DESCRIPTION

Figure 1:
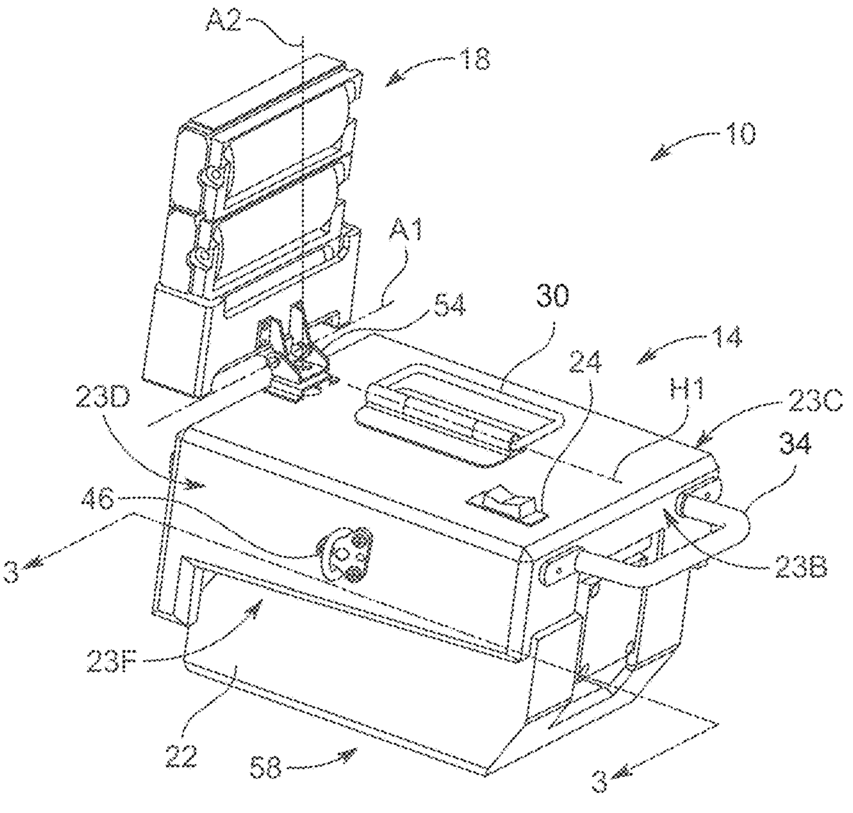
FIG. 1 illustrates a perspective view of a cordless work light.
Figure 2:
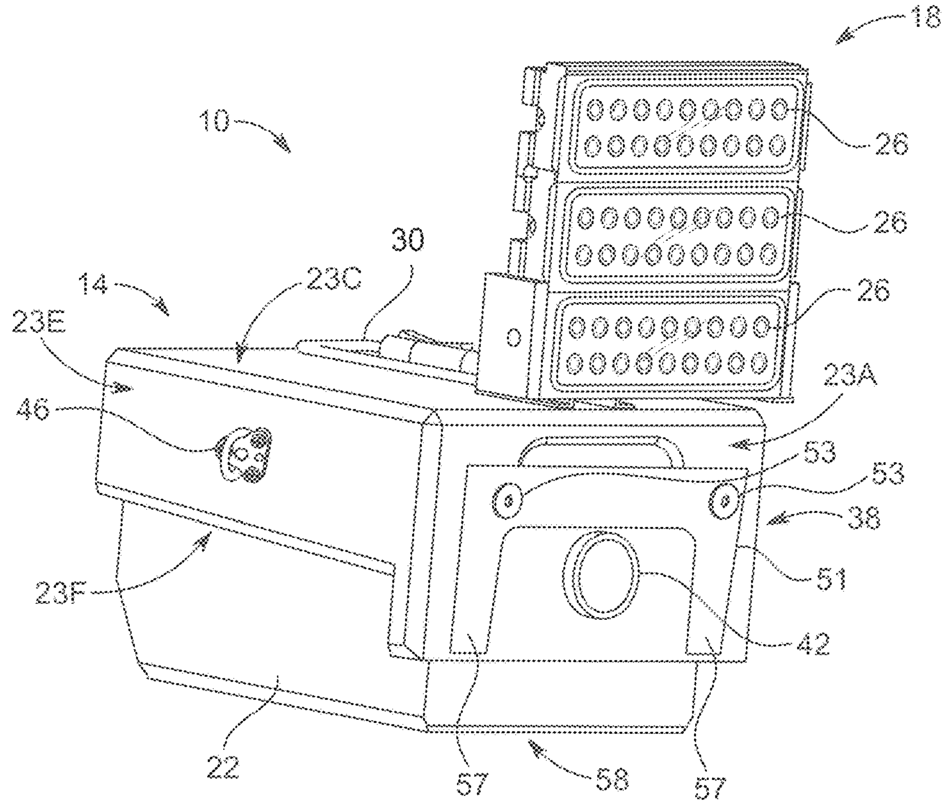
FIG. 2 illustrates an alternate perspective view of the cordless work light of FIG. 1.
Figure 3:
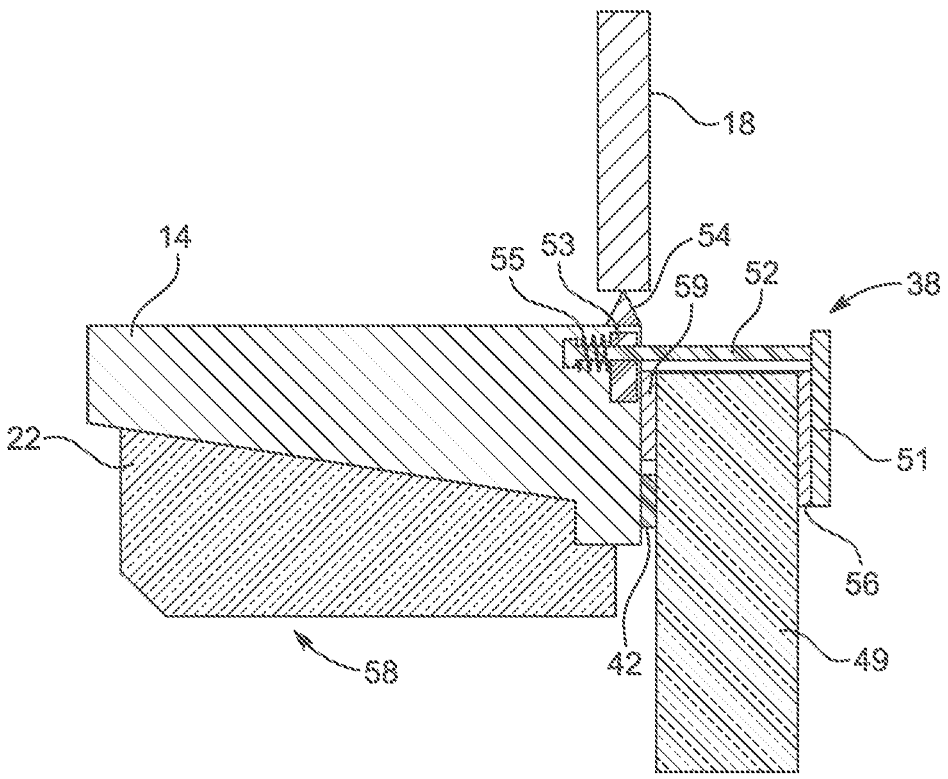
FIG. 3 illustrates a schematic sectional view of the cordless work light of FIG. 1 along line 3-3.

FIGS. 1-3 illustrate a cordless work light 10 including a body 14, a light panel 18, and a battery pack 22. The cordless work light 10 is configured to be moved to a work area and adjusted to illuminate a desired portion of the work area.

As shown in FIGS. 1-2, the body 14 defines a front side 23A, a rear side 23B, a top side 23C, a left side 23D, a right side 23E, and a bottom side 23F. The various sides of the body 14 may also be referred to as a first side, a second side, a third side, a fourth side, a fifth side, and a sixth side, depending on the order in which they are discussed. The illustrated body 14 includes a battery interface. The battery interface mechanically and electrically connects the battery pack 22 to the remainder of the cordless work light 10. For example, the battery interface may include rails and terminals that connect to the battery pack 22. In the illustrated embodiment, the battery interface is positioned on the bottom side 23F of the body, opposite to the top side 23C.

As shown in FIG. 1, the work light 10 also includes a user interface 24. The illustrated user interface 24 is positioned on the top side 23C of the body and is configured to control at least one operational characteristic (i.e., On/Off state, brightness, or color temperature) of the light panel 18. In other embodiments, the user interface 24 may be located elsewhere on the body 14. In the illustrated embodiment, the user interface 24 is a toggle switch including two states. In other embodiments, the user interface 24 may be a dial, a button, a slider, or a capacitive sensitive portion.

As shown in FIGS. 1-2, the work light 10 also includes a first handle 30. The illustrated first handle 30 is positioned on the top side 23C of the body 14 and provides an area for the user to hold while moving the cordless work light 10. Additionally, the first handle 30 is rotatable about a handle axis H1. As such, the first handle 30 may lay relatively flat on the top side 23C of the body 14 when not in use. In some embodiments, the first handle 30 may be located elsewhere on the body 14 or may be omitted.

The work light 10 also includes a second handle 34. The illustrated second handle 34 is positioned on the rear side 23B of the body 14. The rear side 23B is adjacent to the top side 23C and opposite from the front side 23A. In the illustrated embodiment, the rear side 23B is also orthogonal to the top side 23C. Like the first handle 30, the second handle 34 also provides an area for the user to hold while moving the cordless work light 10. In the illustrated embodiment, the second handle 34 is a fixed handle that does not move relative to the body 14. For example, the second handle 34 extends from the rear side 23B in a direction perpendicular to the rear side 23B of the body 14 and parallel to the top side 23C of the body 14. In other embodiments, the second handle 34 may pivot or slide relative to the body 14 between storage and deployed positions, similar to the first handle 34. In some embodiments, the second handle 34 may be located elsewhere on the body 14 or may be omitted.

As shown in FIGS. 2-3, the work light 10 also includes a clamp assembly 38. The illustrated clamp assembly 38 is extendable from the front side 23A of the body 14. The front side 23A is adjacent to the top side 23C. In the illustrated embodiment, the front side 23A is also orthogonal to the top side 23C. The clamp assembly 38 is configured to selectively couple the cordless work light 10 to an external structure 49. Exemplary external structures 49 include, but are not limited to, a truck lip, a van door, a 2×4 strut, or a utility bucket. The illustrated clamp assembly 38 includes a clamp body 51, a pair of rods 52, an internal support bracket 53, and a set of clamp springs 55. In the illustrated embodiment, the clamp body 51 is U-shaped and includes a contact pad 56 and a pair of clamp legs 57. The contact pad 56 may be made of a relatively soft material (e.g., an elastomeric material, rubber, foam, etc.) configured to limit damage to the external structure 49. In the illustrated embodiment, an additional contact pad 59 is positioned on the front side 23A of the body 14 between the body 14 and the clamp body 51. As such, the external structure 49 may be sandwiched between the contact pads 56, 59 when the clamp assembly 38 mounts the work light 10 to the external structure 49. In some embodiments, the clamp legs 57 may be tapered to receive the external structure 49 more easily. The rods 52 are coupled to the clamp body 51 and are moveable axially into and out of the body 14. In the illustrated embodiment, the clamp assembly 38 includes two rods 52. In other embodiments, the clamp assembly 38 may include fewer or more rods 52. The internal support bracket 53 is positioned within the body 14 and axially supports the rods 52. The clamp springs 55 are positioned between an end of the rod 52 and the internal support bracket 53. In the illustrated embodiment, each clamp spring 55 is a coil compression spring positioned around a portion of one of the rods 52. In other embodiments, the clamp assembly 38 may include different types of springs or biasing members. The clamp springs 55 bias the rods 52 and the clamp body 51 towards the body 14.

To couple the cordless work light 10 to an external structure 49, the user pulls the clamp body 51 away from the front side 23A of the body to create space between the clamp body 51 and the front side 23A. Once space is created, the external structure 49 is inserted into the space between the clamp body 51 and the front side 23A. Once inserted, the user releases the clamp body 51, and the clamp springs 55 bias the clamp body 51 towards the front side 23A, until the contact pad 56 contacts the external structure 49. The biasing force of the clamp spring 55 maintains the position of the cordless work light 10 on the external structure 49.

With continued reference to FIGS. 2-3, the work light 10 also includes a magnet 42. The magnet 42 is positioned adjacent to the clamp assembly 38 on the front side 23A of the body 14. The magnet 42 is configured to magnetically attract the external structure 49 (or other object), if the external structure 49 is ferrous. When used in combination with the clamp assembly 38, the magnet 42 helps more firmly couple the work light 10 to the external structure 49. In some embodiments, the work light 10 may include multiple magnets positioned on the front side 23A of the body 14. In other embodiments, the magnet 42 may be located elsewhere on the body 14 or may be omitted.

Figure 5:
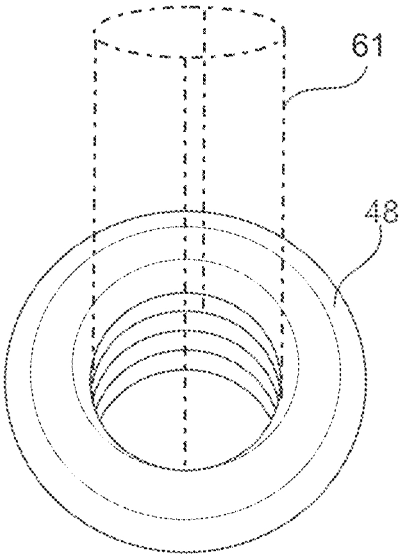
FIG. 5 illustrates a top view of a threaded insert of the cordless work light of FIG. 1.

In some embodiments, the work light 10 may include a threaded insert 48, as shown in FIG. 5. The threaded insert 48 can receive another external structure, such as a threaded post 61, for mounting the cordless work light 10. For example, the threaded post 61 may be part of a tripod, and the threaded insert 48 may selectively couple to the threaded post 61 to mount the cordless work light 10 on the tripod. In some embodiments, the threaded insert 48 may be located in place of the magnet 42. In other embodiments, the threaded insert 48 may be located elsewhere on the body 14, such as the rear side 23B, the left side 23D, or the right side 23E, or may be located on the front side 23A in addition to the magnet 42. In still other embodiments, the work light 10 may include multiple threaded inserts located on different sides of the body 14.

Figure 4:
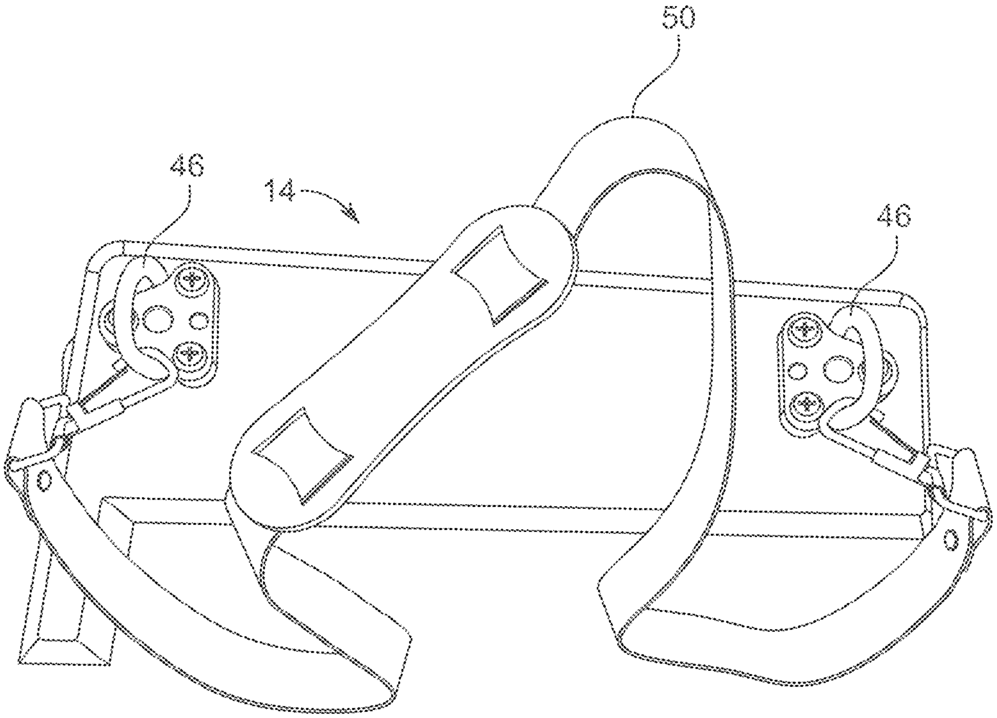
FIG. 4 illustrates a side view of a portion of the cordless work light of FIG. 1.

As shown in FIGS. 1, 2, and 4, the work light 10 includes a plurality of eyelets 46. As shown in FIGS. 1 and 2, the eyelets 46 are positioned on opposite sides of the body 14 (e.g., the left and right sides 23D, 23E of the body 14). As shown in FIG. 4, the eyelets 46 may be positioned on the same side of the body 14. The eyelets 46 are configured to receive a strap 50 (FIG. 4) to provide an additional option for carrying and transporting the cordless work light 10 for the user. The eyelets 46 can alternatively be used to fasten the cordless work light 10 to a cylindrical external structure. Although the illustrate examples include two eyelets 46, in some embodiments, the work light 10 may only include a single eyelet 46 or the work light 10 may include more than two eyelets on various sides of the body 14. In other embodiments, the eyelets 46 may be omitted.

As shown in FIGS. 1-3, the light panel 18 is configured to produce light when powered by the battery pack 22. In the illustrated embodiment, the light panel 18 is coupled to the top side 23C of the body 14 via a hinge 54. The light panel 18 includes a plurality of LEDs 26 that are rated for indoor and outdoor use. The LEDs 26 are rated for a brightness of 8,100 lumens for a 10-hour run time. In other embodiments, the brightness and runtime may be greater or less than 8,100 lumens and/or the run time may be longer or shorter than 10 hours. The illustrated hinge 54 can adjust a position of the light panel 18 relative to the body 14. For example, the hinge 54 may allow the light panel 18 to rotate about a first pivot axis A1 and a second pivot axis A2 to position the light panel 18 in an optimal illumination direction. In the illustrated embodiment, the first pivot axis A1 is perpendicular to the second pivot axis A2. In other embodiments, the light panel 18 may only pivot about one axis, or the hinge 54 may be a universal joint (e.g., a ball joint) that allows movement along more than two axes. The light panel 18 can also be pivoted to reduce the overall form factor of the cordless work light 10 for storage in a toolbox, utility vehicle, or tool shed. For example, the light panel 18 may fold to lay along and generally parallel to the top side 23C of the body 14. In such a position, the light panel 18 may cover the first handle 34.

As shown in FIGS. 1-3, the battery pack 22 is configured to provide power for the cordless work light 10. The battery pack 22 may be a power tool or power equipment battery pack. As such, the battery pack 22 may be removable from the body 14 and rechargeable. For example, the battery pack 22 may be an MX FUEL battery pack sold by Milwaukee Electric Tool Corporation. In other embodiments, the battery pack 22 may be a different type of battery pack and may have various voltages (e.g., 12V, 18V, 40V, etc.) and chemistries (e.g., Li-ion, NiMH, etc.). The battery pack 22 may include a plurality of terminal connectors configured to electrically couple to the battery interface of the body 14. The battery pack 22 also includes a support surface 58. The support surface 58 is a bottom surface of the battery pack 22 and contacts a ground or other surface (e.g., tabletop, truck bed, floor, etc.) of the work area. When the battery pack 22 is connected to the body 14, the support surface 58 is generally parallel to the top side 23C of the body 14. As such, the battery pack 22 can support the work light 10 on the ground or other surface during operation.

Figure 6:
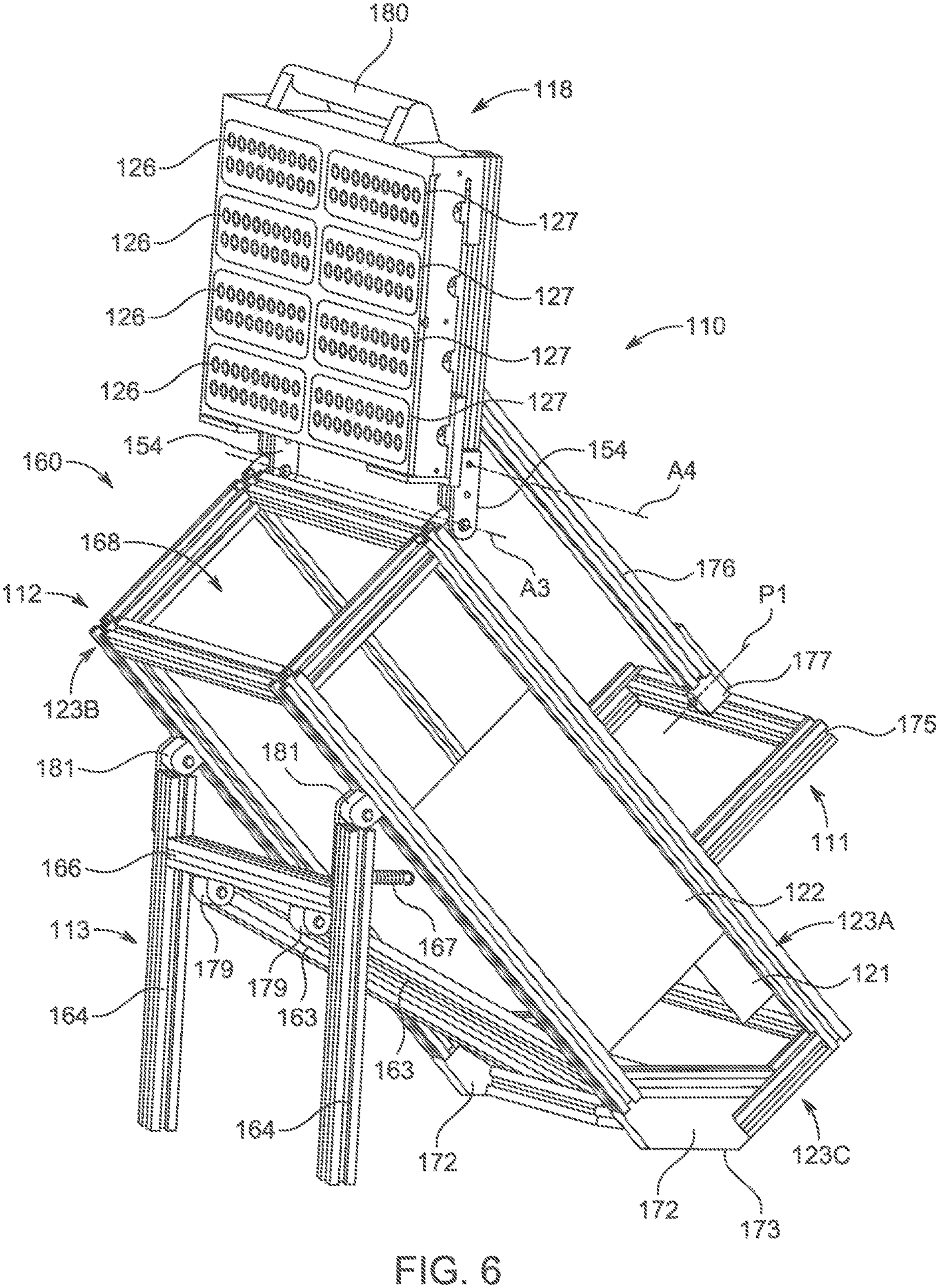
FIG. 6 illustrates a perspective view of another embodiment of a cordless work light in a deployed position.
Figure 7:
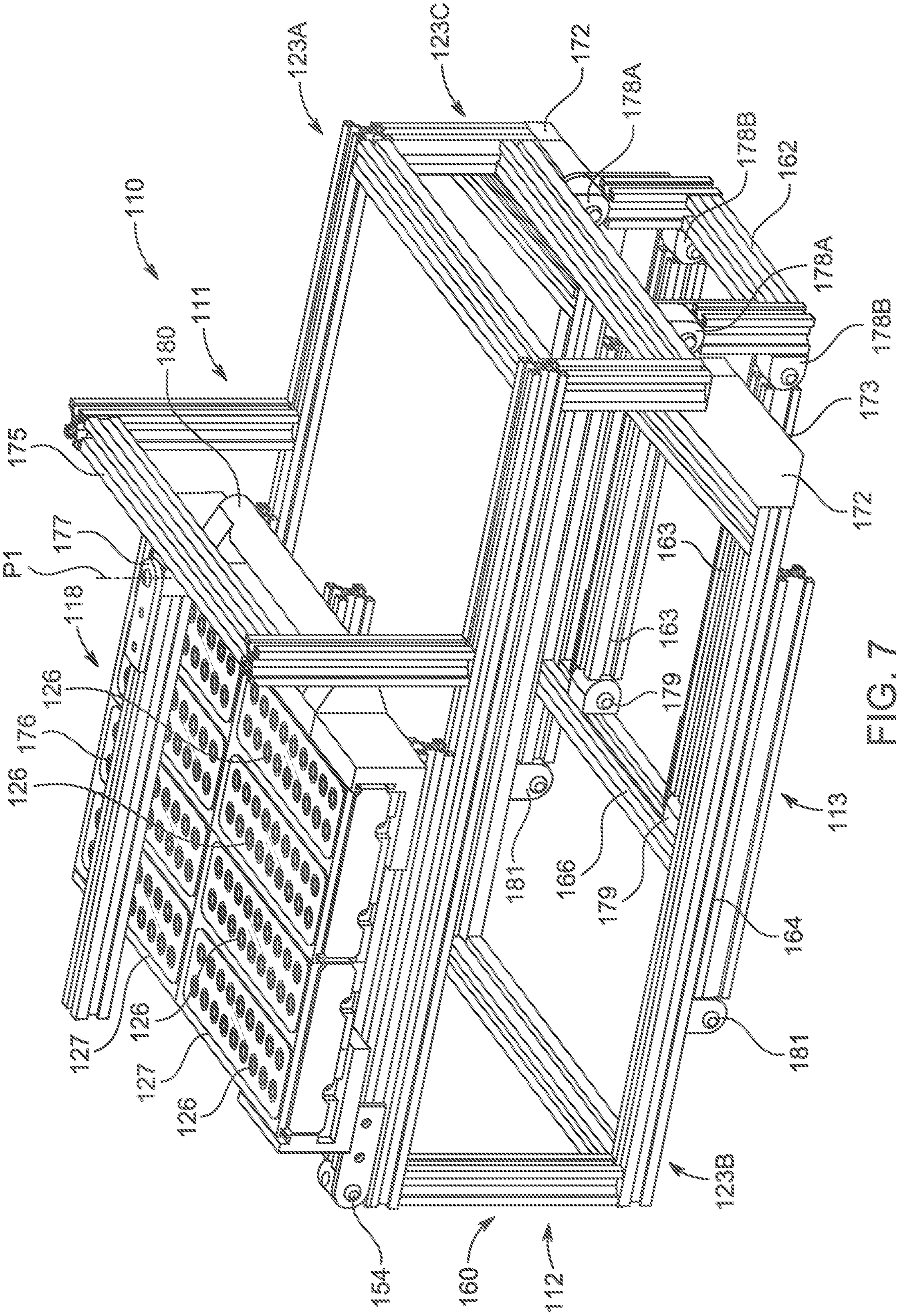
FIG. 7 illustrates a perspective view of the cordless work light of FIG. 6 in a storage position.
Figure 8:
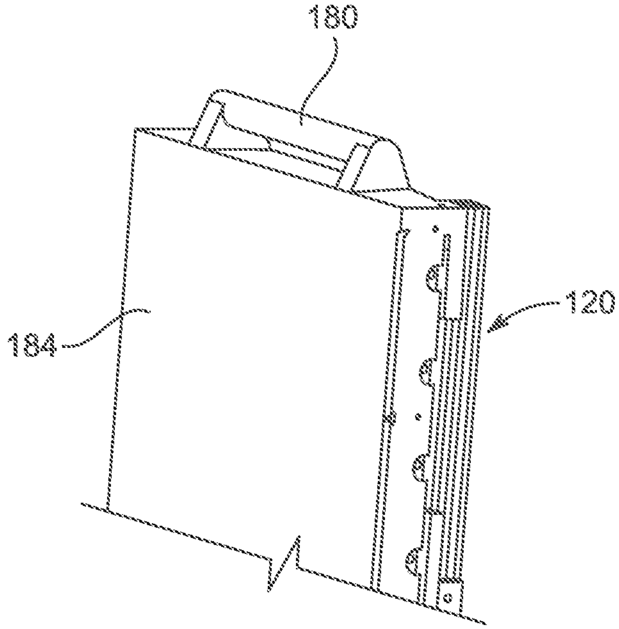
FIG. 8 illustrates a perspective view of a diffused light panel for use with the cordless work light of FIG. 6.

FIGS. 6-8 illustrate another cordless work light 110 including a support structure 160 and a light panel 118 coupled to the support structure 160. The cordless work light 110 is configured to be moved to a work area and adjusted to illuminate a desired portion of the work area.

The support structure 160 includes a first side 123A, a second side 123B, and a third side 123C. The first side 123A is generally opposite the second side 123B. The third side 123C extends between the first side 123A and the second side 123B. In the illustrated embodiment, the third side 123C is generally perpendicular to the first side 123A and the second side 123B. The support structure 160 also includes a panel support assembly 111, a frame 112, and a stand assembly 113.

As shown in FIGS. 6-7, the panel support assembly 111 is positioned on the first side 123A of the support structure 160 and is configured to hold the light panel 118 in a plurality positions. The panel support assembly 111 includes a set of hinges 154, a prop brace 175, and a light panel prop 176. The hinges 154 rotatably couple the light panel 118 to the frame 112. In the illustrated embodiments, the hinges 154 are coupled to an edge of the first side 123A opposite from the third side 123C. The illustrated hinges 154 provide the light panel 118 with two degrees of freedom about two axes A3, A4. The axes A3, A4 are parallel to each other. In other embodiments, the axis A3, A4 may be non-parallel (e.g., perpendicular), or the hinges 154 may only provide one degree of freedom. The prop brace 175 extends from the first side 123A and is positioned between the hinges 154 and the third side 123C. The prop brace 175 is coupled to the light panel prop 176 via a pivot bracket 177. The light panel prop 176 is rotatable about a prop axis P1 defined by the pivot bracket 177. In operation, the light panel prop 176 is configured couple to a rear of the light panel 118 and support the light panel 118 in a fixed orientation, as shown in FIG. 6. When coupled to the rear side of the light panel 118, the light panel prop 176 also provides a handle for carrying and manipulating the cordless work light 110. When the light panel 118 is folded against the first side 123A of the support structure 160, as shown in FIG. 7, the light panel prop 176 may extend over the light panel 118 to inhibit movement of the light panel 118 about the hinges 154.

As shown in FIGS. 6-7, the frame 112 includes a battery compartment 168 and a set of feet 172. In the illustrated embodiment, the frame 112 is an open structure defined by a plurality of beams or struts. In other embodiments, the frame 112 may be a partially or fully enclosed body. The battery compartment 168 receives a battery pack 122 and includes a battery pack interface 121 to mechanically and electrically connect the battery pack 122 to the cordless work light 110. The battery pack interface 121 electrically couples the battery pack 122 to the light panel 118 and other portions of the cordless work light 110. The battery pack 122 may be a power tool or power equipment battery pack. As such, the battery pack 122 may be removable from the frame 112 and rechargeable. For example, the battery pack 122 may be an MX FUEL battery pack sold by Milwaukee Electric Tool Corporation. In other embodiments, the battery pack 122 may be a different type of battery pack and may have various voltages (e.g., 12V, 18V, 40V, etc.) and chemistries (e.g., Li-ion, NiMH, etc.). The battery pack 122 may provide a 4-hour run time for the cordless work light 110. In other embodiments, the run time may be greater.

The feet 172 are coupled to concerns of the frame 112 between the second side 123B and the third side 123C. The feet 172 are configured to selectively support the work light 110, as shown in FIG. 6. Each foot 172 includes a support surface 173. In the illustrated embodiment, the support surfaces 173 are angled with respect to second side 123B and contact the ground surface of the work area. For example, the support surfaces 173 may be angled between about 30 degrees and 60 degrees relative to the second side 123B. In the illustrated embodiment, the support surfaces 173 are angled about 50 degrees relative to the second side 123B.

As shown in FIGS. 6-7, the stand assembly 113 is moveable relative to the frame 112 between a storage position (FIG. 7) and a deployed position (FIG. 6). The storage position may also be referred to as a first position, a folded position, or a collapsed position. The deployed position may also be referred to as a second position, an operational position, or an upright position. In the storage position, the footprint of the stand assembly 113 and the cordless work light 110 is reduced for easier transport. Specifically, the reduced footprint enables easier storage in vehicles and easier maneuverability when transporting by foot. In the deployed position, the footprint of the stand assembly 113 and the support structure 160 is expanded and the cordless work light 110 can be supported in an upright position. The illustrated stand assembly 113 includes an actuator 162, a set of struts 163, and a set of legs 164.

As shown in FIG. 7, the actuator 162 is movably (e.g., rotatably) coupled to both the frame 112 and the struts 163 via a plurality of pivot brackets 178A, 178B. The illustrated actuator 162 includes a crossbar extending between the struts 163. The crossbar is connected by short beams to the pivot brackets 178A on the frame 112. The pivot brackets 178A on the frame 112 are positioned inboard of the feet 172. The other pivot brackets 178B are coupled to ends of the crossbar and ends of the struts 163. In the storage position (FIG. 7), an outer surface, or contact surface, of the actuator 162 is positioned parallel to the third side 123C of the support structure 160. In the deployed position (FIG. 6), the outer surface of the actuator 162 no longer remains parallel to the third side 123C of the support structure 160. Rather, the outer surface of the actuator 162 is generally parallel to the support surfaces 173 of the feet 172. The outer surface of the actuator 162 may also be generally coplanar with the support surfaces 173 of the feet 172. In the transition from the storage position to the deployed position, the actuator 162 pivots with respect to the frame 112 about the pivot brackets 178A and towards the feet 172, which in turn pushes the struts 163 and pivots the struts 163 relative to the actuator 162 about the pivot brackets 178B.

As shown in FIGS. 6-7, the struts 163 are rotatably coupled to both the actuator 162 via the pivot brackets 178B and a leg crossbeam 166 via a plurality of pivot brackets 179. The leg crossbeam 166 extends between the legs 164. The pivot brackets 179 are positioned on the leg crossbeam 166 inboard of the legs 164 and coupled to ends of the struts 163 opposite the pivot brackets 178B. In the storage position, the struts 163 are parallel to the first and second sides 123A, 123B. In the operational position, the struts 163 are no longer parallel to the first and second sides 123A, 123B. In the transition from the storage position to the deployed position, the struts 163 pivot away from the frame 112 due to pushing force from the actuator 162, which in turn pivots the leg crossbeam 166 and the legs 164.

As shown in FIGS. 6-7, each leg 164 is rotatably coupled to the second side 123B of the support structure 160 via a pivot bracket 181. The pivot brackets 181 are coupled to ends of the legs 164. Both legs 164 are coupled to one another through the leg crossbeam 166. In the storage position, the legs 164 rest against the second side 123B of the support structure 160. In the deployed position, the legs 164 no longer rest against the second side 123B of the support structure 160 and are not parallel to the second side 123B. For example, the legs 164 may form an angle between 30 degrees and 60 degrees relative to the second side 123B of the support structure 160. In the illustrated embodiment, the angle is about 45 degrees. In the transition from the storage to the deployed position, the legs 164 pivot away from the frame 112 of the support structure 160 due to the pushing force from the struts 163 and ends of the legs 164 opposite the pivot brackets 181 eventually contact a ground surface of the work area.

Additionally, the stand assembly 113 includes an elastic element 167 coupled to the legs 164 and the frame 112. The illustrated elastic element 167 is a single spring element extending between the leg crossbar 166 and the frame 112. In other embodiments, the stand assembly 113 may include multiple elastic elements 167 (e.g., one spring element coupled to each leg 164). The elastic element 167 biases the legs 164 towards the storage position. In the illustrated embodiment, the elastic element 167 is a coil tension spring. In other embodiments, the elastic element 167 may be another suitable biasing element, such as a torsion spring at one or both of the pivot brackets 181. In still other embodiments, the elastic element 167 may be omitted.

In the illustrated embodiment, the stand assembly 113 includes two struts 163 and two legs 164. In other embodiments, the stand assembly 113 may include fewer or more struts 163 and/or legs 164. For example, the stand assembly 113 may include a single strut 163 and two legs 164, may include a single strut 163 and a single leg 164, and may include more than two struts 163 and two legs 164. In such embodiments, the stand assembly 113 may include a corresponding number of pivot brackets.

As shown in FIGS. 6-7, the light panel 118 is configured to illuminate a surrounding area. The illustrated light panel 118 includes a plurality of LEDs 126, a clear lens 127 and a light panel handle 180. In the illustrated embodiment, the LEDSs 126 are rated for a brightness of 15,000 lumens, but in other embodiments, the brightness of the LEDs 126 may be greater or less than 15,000 lumens. The light panel handle 180 allows the user to carry the entire cordless work light 110 to a new location and serves to orientate the light panel 118 about the axes A3, A4. Additionally, the light panel 118 can be replaced with a diffused light panel 120 (FIG. 8). The diffused light panel 120 has a similar structure the light panel 118, but further includes a diffuser lens 184, rather than the clear lens 127. The diffuser lens 184 disperses the light generated by the LEDs 126 to spread the light over a broad area. The cordless work light 110 is also compatible other light heads for different lighting options. In other embodiments, the diffuser lens 184 can be directly coupled on top of the clear lens of the light panel 118.

In operation, the cordless work light 110 is transported to a desired work area while in the storage position (FIG. 7). The user then tilts the cordless work light 110 to an upright position so the support surfaces 173 of the feet 172 contact the ground surface. As the cordless work light 110 is lowered so the support surfaces 173 contact the ground surface, the actuator 162 simultaneously contacts the ground surface and is pivoted towards the feet 172. As the actuator 162 pivots, the struts 163 are pushed and pivot away from the frame 112, which in turn pivots the legs 164 away from the frame 112 as well. The legs 164 thereby pivot outward until the ends of the legs 164 engage the ground surface. In this deployed position (FIG. 6), the support structure 160 is supported similar to a tripod by the end of each 164 and the support surfaces 173 of the feet 172.

Before or after the support structure 160 is moved to the deployed position, the light panel prop 176 may be pivoted out of the path of the light panel 118. The light panel 118 may then be pivoted to face the desired illumination direction. Once a desired orientation of the light panel 118 is reached, the light panel prop 176 is coupled to the rear of the light panel 118 to maintain the orientation. In scenarios where the light panel prop 176 is coupled to the rear of the light panel 118 before the support structure 160 is moved to the deployed position, the light panel prop 176 may be used as a handle to manipulate the support structure 160 to achieve the deployed position (e.g., by lifting the support structure and placing the feet 172 in contact with the ground surface).

To transition the cordless work light 110 into the storage position, the user lifts the cordless work light 110 (e.g., via the light panel prop 176), which causes the ends of the legs 164 to no longer contact the ground surface. When the legs 164 no longer contact the ground surface, the clastic element 167 biases the legs 164 towards the support structure 160. As the legs 164 move towards the support structure 160, the struts 163 pivot towards the support structure 160 and the actuator 162 pivots to become parallel to the third side 123C. Then, the light panel prop 176 may be uncoupled from the rear of the light panel 118 and moved out of the path of the light panel 118. Next, the light panel 118 may be pivoted to lay on the first side 123A, and the light panel prop 176 may be pivoted to block the light panel 118 from moving away from the first side 123A.

Figure 9:
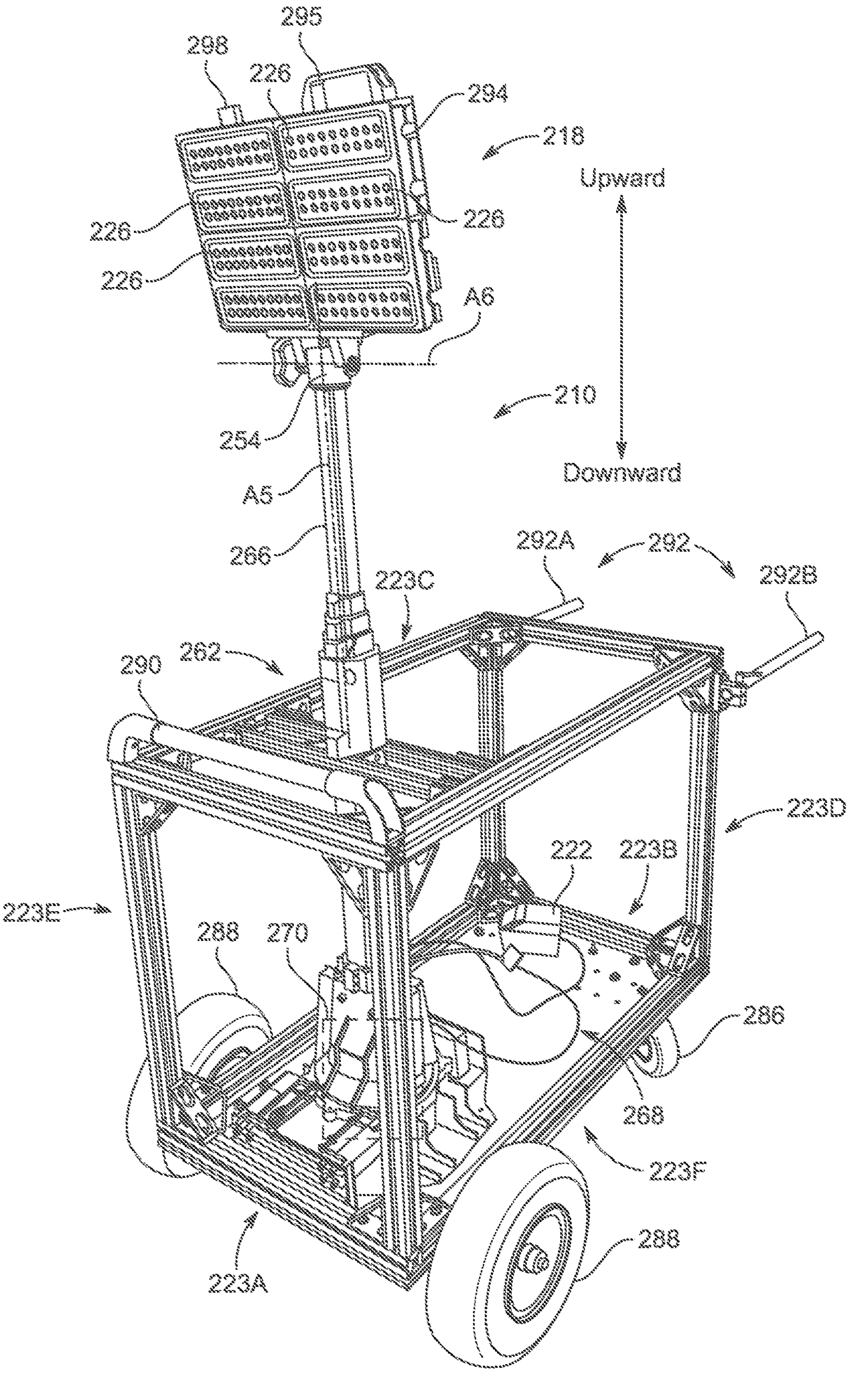
FIG. 9 illustrates a perspective view of another embodiment of a cordless work light.
Figure 10:
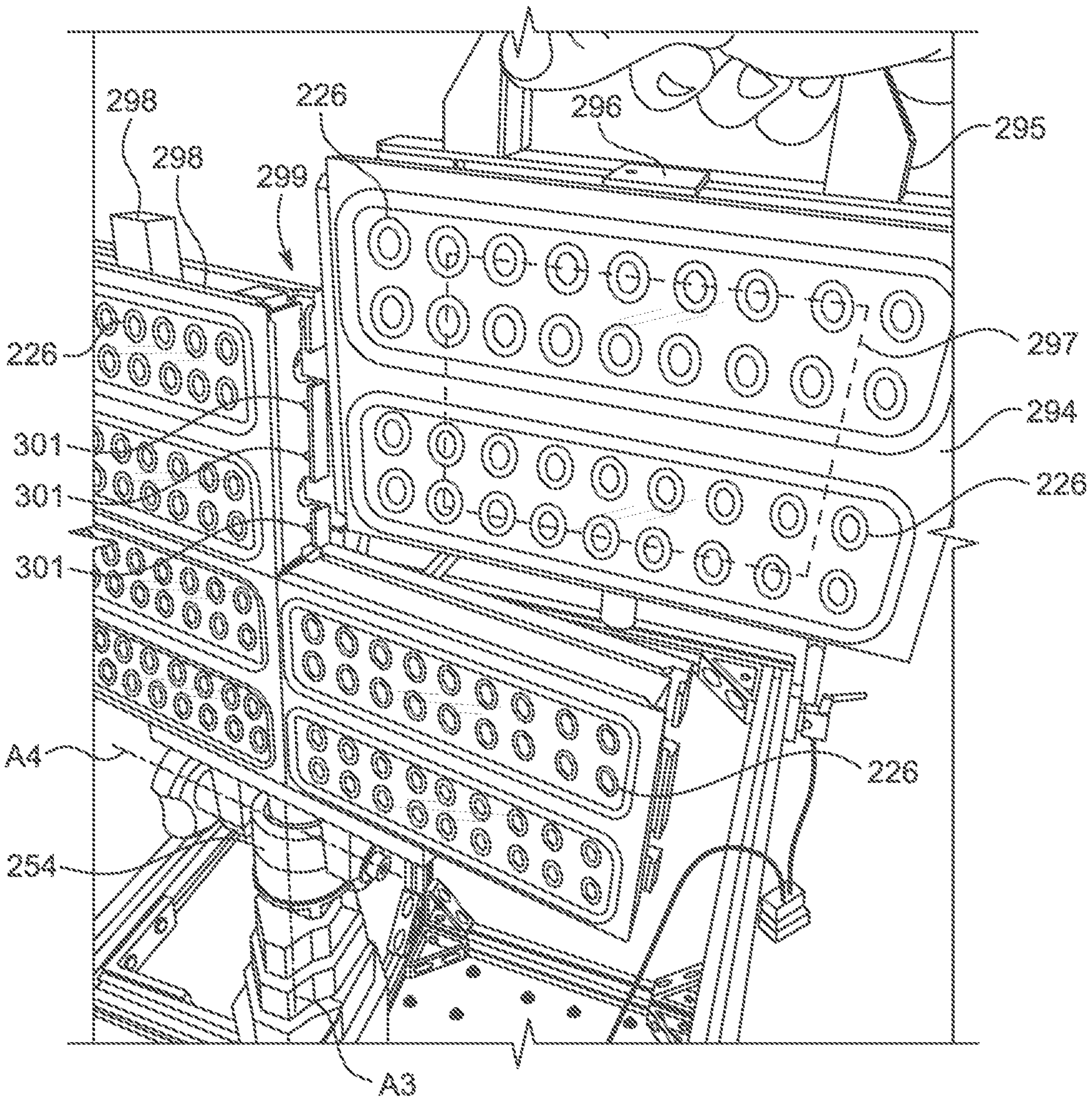
FIG. 10 illustrates an enlarged perspective view of a light panel of the cordless work light of FIG. 9.

FIGS. 9-10 illustrate another cordless work light 210. The illustrated cordless work light 210 includes a cart 262, a mast 266, and a light panel 218. The cordless work light 210 is configured to be moved to a work area and adjusted to illuminate a desired portion of the work area.

As shown in FIG. 9, the cart 262 is configured to house and support the portions of the cordless work light 210. The illustrated cart 262 defines a front side 223A, a rear side 223B, a top side 223C, a left side 223D, a right side 223E, and a bottom side 223F. The various sides of the body 14 may also be referred to as a first side, a second side, a third side, a fourth side, a fifth side, and a sixth side, depending on the order in which they are discussed. The illustrated cart 262 is an open structure defined by a plurality of beams or struts. In other embodiments, the cart 262 may be a partially or fully enclosed body. The cart 262 is moveable using some combination of caster wheels 286, pneumatic wheels 288, a push handle 290, and a lift handle 292.

In the illustrated embodiment, the work light 210 includes two caster wheels 286 positioned on the bottom side 223F adjacent to the rear side 223B. The caster wheels 286 are selectively pivotable with respect to the left and right sides 223D, 223E. The pivoting of the caster wheels 286 can be locked via a castor wheel actuator (not shown). In operation, the caster wheels 286 allow the user to steer the cart 262 in a desired movement direction. In some embodiments, the work light 210 may include fewer or more caster wheels 286 and/or the caster wheels 286 may be located elsewhere on the cart 262. In other embodiments, the caster wheels 286 may be omitted.

In the illustrated embodiment, the work light 210 includes two pneumatic wheels 288 positioned on the bottom side 223F adjacent to the front side 223A. The pneumatic wheels 288, or tires, remain parallel to the left and right sides 223D, 223E. The pneumatic wheels 288 have a larger wheel diameter than the caster wheels 286 and include tread to provide additional traction. In operation, the pneumatic wheels 288 are configured to overcome rough terrain and obstacles. In some embodiments, the work light 210 may include fewer or make pneumatic wheels 288 and/or the pneumatic wheels 288 may be located elsewhere on the cart 262. In other embodiments, the pneumatic wheels 288 may be omitted.

The push handle 290 is coupled to the top side 223C of the cart 262 adjacent the front side 223A. In particular, the push handle 290 extends upwardly from the top side 223C of the cart 262 (i.e., away from the ground surface). The push handle 290 is located adjacent the same side of the cart 262 as the pneumatic wheels 288. In addition, the push handle 290 is located generally opposite from the caster wheels 286. The illustrated push handle 290 is a fixed handle in that the push handle 290 is not movable relative to the cart 262. The push handle 290 allows a user to direct the cart 262 to a new work area. For example, a user may push the cart 262 from a location near the pneumatic wheels 288, but still have good maneuverability due to the caster wheels 286. In some embodiments, the push handle 290 may be omitted.

The lift handle 292 is coupled to the rear side 223B of the cart 262 adjacent the top side 223C. In particular, the lift handle 292 extends horizontally from the rear side 223B of the cart 262 (i.e., in a direction parallel to the ground surface). The lift handle 292 is located adjacent the same side of the cart 262 as the caster wheels 286. In addition, the lift handle 292 is located generally opposite from the pneumatic wheels 288. The lift handle 292 allows the user to lift the cart 262. In particular, the lift handle 292 allows the user to lift the rear side 223B of the cart 262 such that the caster wheels 286 are lifted off of the ground surface and the cart 262 is only supported by the pneumatic wheels 288. The cart 262 may then be more easily moved (e.g., pushed or pulled) along rough terrain, similar to a wheelbarrow. In the illustrated embodiment, the lift handle 292 includes a set of lift handle portions 292A, 292B spaced apart from one another. One of the lift handle portions 292A is positioned adjacent to the right side 223E of the cart 262, and the other lift handle portion 292B is positioned adjacent the left side 223D of the cart 262. In other embodiments, both lift handle portions may be connected and/or the lift handle 292 may extend from the top side 223C of the cart 262. In some embodiments, the lift handle portions 292A, 292B may be movable (e.g., pivotable, telescoping, etc.) relative to the cart 262 between extended positions, in which the lift handle portions 292A, 292B extend perpendicularly from a side of the cart 262 (as shown in FIG. 9), and collapsed positions, in which the lift handle portions 292A, 292B lay against sides of the cart 262.

The cart 262 also defines a battery compartment 268. The battery compartment 268 is configured to receive at least one battery pack 222. The battery compartment 268 supports the battery pack 22 and electrically connects the battery pack 222 to the light panel 218. In some embodiments, the battery compartment 268 may also electrically connect the battery pack 222 to a motor 270 of the mast 266. The battery pack 222 may be a power tool or power equipment battery pack. As such, the battery pack 222 may be removable from the cart 262 and rechargeable. For example, the battery pack 222 may be an MX FUEL battery pack sold by Milwaukee Electric Tool Corporation. In other embodiments, the battery pack 222 may be a different type of battery pack and may have various voltages (e.g., 12V, 18V, 40V, etc.) and chemistries (e.g., Li-ion, NiMH, etc.). In the illustrated embodiment, the battery compartment 268 supports and electrically connects one battery pack 222. In other embodiments, the battery compartment 268 may support and electrically connect two or more battery packs 222. In some embodiments, the battery compartment 268 may also be used to store other objects, such as tools, replacement parts, and the like. In such embodiments, the cart 262 may be divided or separated into different sections or compartments (e.g., a battery compartment, a storage compartment, a mast compartment, etc.). In the illustrated embodiment, the battery pack 222 powers the cordless work light 210 for 8 hours. In other embodiments, the battery pack 222 may power the cordless work light for greater or less than 8 hours.

As shown in FIG. 9, the mast 266 is mounted to the cart 262 and supports the light panel 218. The illustrated mast 266 includes a plurality of tubes that telescope relative to each other to extend and retract the mast 266. In some embodiments, the mast 266 includes the motor 270, which drives the mast 266 in upward or downward directions along a mast axis A5 (i.e., a longitudinal axis of the mast 266). In other embodiments, the mast 266 may be manually movable in the upward and downward directions by, for example, a crank or manually separating the tubes. In the illustrated embodiment, the mast 266 is moveable from a minimum height of 4 feet to a maximum height of 10 feet. In other embodiments, the mast 266 may telescope greater than 10 feet or less than 4 feet. The light panel 218 is mounted to at an end of the mast 266 opposite from the cart 262 via a hinge 254. The hinge 254 can adjust (e.g., rotate) the position of the light panel 218 along the mast axis A5. The illustrated hinge 254 can also adjust (e.g., pivot) the light panel 218 about a rotational axis A6 that is orthogonal to the mast axis A5. In other embodiments, the hinge 254 may only allow movement of the light panel 218 about one axis, or the hinge 254 may be a universal joint (e.g., a ball and socket joint) that allows more than two degrees of freedom.

The light panel 218 is configured to illuminate the surroundings of the cordless work light 210 and includes a plurality of LEDs 226. The LEDs 226 may be operated by a first user interface. The first user interface may be located on the cart 262. In some embodiments, the first user interface may includes buttons, dials, switches, a display screen or other indicators, and the like. The LEDs 226 of the light panel 218 operate at a brightness ranging from 15,000 to 30,0000 lumens, depending on the number of battery packs 222 installed. The brightness of the LEDs 226 is positively correlated with the number of battery packs 222 installed. In other embodiments, the LEDs 226 may operate at brightness greater 30,000 lumens or less than 15,000 lumens. The first user interface allows the user to set one or more operational characteristics (i.e., On/Off state, brightness, or color temperature) of the light panel 218.

As shown in FIG. 10, the light panel 218 includes a removable light panel portion 294. The removable light panel portion 294 can be decoupled from the remainder of the light panel 218 and operated independently from the remainder of the light panel 218. For example, the removable light panel portion 294 may be operated in a hand-held configuration. The removable light panel portion 294 includes a light panel handle 295, a second user interface 296, and an auxiliary battery 297. The light panel handle 295 allows the user to carry the removable light panel portion 294 to a desired location apart from the cart 262. Also, when removable light panel portion 294 is recoupled to the light panel 218, the light panel handle 295 can be used to adjust the orientation of the entire light panel 218. The second user interface 296 is configured to set an operational characteristic (i.e., On/Off state, brightness, or color temperature) of the LEDs 226 only on the removable light panel portion 294, when in the handheld configuration. The auxiliary battery 297 powers the LEDs 226 of the removable light panel portion 294 when uncoupled from the light panel 218. In some embodiments, the auxiliary battery 297 may be a removable battery pack. In other embodiments, the auxiliary battery may be a dedicated battery.

As shown in FIG. 10, the illustrated removable light panel portion 294 is mechanically and electrically coupled to the remainder of the light panel 218 via a mounting rail 299 and a locking actuator 298. The mounting rail 299 receives a portion of the removable light panel portion 294 and includes a plurality of electrical contacts 301. When coupled, the electrical contacts 301 line up with corresponding electrical contacts of the removable light panel portion 294. When aligned, the connection between the electrical contacts 301 and the corresponding electrical contacts is configured to transfer power from the battery pack 222 to the auxiliary battery 297 and receive a signal from the first user interface to command the LEDs 226 of the removable light panel portion 294. The locking actuator 298 is configured to selectively engage the removable light panel portion 294 and prevent the removal of the removable light panel portion 294 from the light panel 218. In one instance, the locking actuator 298 is slid towards the removable light panel portion 294 and prevents the removable light panel portion 294 from sliding out of the mounting rail 299. In another instance, the locking actuator 298 is slid away from the removable light panel portion 294 to allow the removable light panel portion 294 to slide out of the mounting rail 299. In other embodiments, the removable light panel portion 294 may be mechanically and electrically coupled to the remainder of the light panel 218 using other suitable mechanisms.

In some embodiments, the light panel 218 may include more than one removable light panel portion. For example, the light panel 218 may include two removable light panel portions, three removable light panel portions, four removable light panel portions, or more. In embodiments, with greater number of light panel portions, removing all of the light panel portions may result in the entire light panel 218 being removed from the mast 266 and operated in independent sections.

In operation, the cordless work light 210 is transported to a desired work area using some combination of the caster wheels 286, the pneumatic wheels 288, the push handle 290, and the lift handle 292. Once at the desired work location, the light panel 218 is orientated to face a desired illumination direction and the first user interface is used to change the operational characteristics of LEDs 226. Next, the mast 266 can be extended or retracted to move the light panel 218 to a desired height. At any point in the operation, the user can decouple the removable light panel portion 294 for use in the handheld configuration. The user starts by moving the locking actuator 298 out of contact with the removable light panel portion 294, and then the removable light panel portion 294 can be slid out of the mounting rail 299 using the light panel handle 295. Once decoupled, the second user interface 296 can be used to control the operational characteristics of the LEDs 226 of the removable light panel portion 294. Later, the user can recouple the removable light panel portion 294 to the mounting rail 299, which simultaneously aligns the electrical contacts 301 with the corresponding electrical contacts of the removable light panel portion 294. Once recoupled, the battery pack 222 on the cart 262 may recharge the auxiliary battery 297 in the removable light panel portion 294.

Various features and advantages of the invention are set forth in the following claims.

What is claimed is:

1. A work light comprising:

a body including an interface, the body having a first side and a second side;

a battery pack coupled to the interface and extending outwardly beyond the body in a direction perpendicular to the first side, the battery pack including a support surface that is parallel to the first side and configured to support the body on a surface;

a light panel movably coupled to the first side of the body and electrically coupled to the interface;

a clamp assembly extendable from the second side of the body, the clamp assembly configured to selectively couple the work light to an external structure; and a magnet supported on the second side of the body.

2. The work light of claim 1, wherein the light panel is rotatable relative to the first side of the body about a rotational axis.

3. The work light of claim 2, wherein the rotational axis is a first rotational axis, and wherein the light panel is also rotatable relative to the first side of the body about a second rotational axis that is perpendicular to the first rotational axis.

4. The work light of claim 1, wherein the first side is orthogonal to the second side.

5. The work light of claim 4, wherein the first side is adjacent to the second side.

6. The work light of claim 1, further comprising a plurality of eyelets coupled to the body, wherein the plurality of eyelets is configured to couple to a strap for carrying the work light.

7. The work light of claim 1, further comprising a threaded insert on the body, wherein the threaded insert is configured to receive a threaded post for mounting the work light.

8. The work light of claim 1, further comprising a handle coupled to the body.

9. The work light of claim 8, wherein the handle is rotatable relative to the body about a handle axis.

10. The work light of claim 8, wherein the handle is a first handle, and further comprising a second handle coupled to the body and spaced apart from the first handle.

11. The work light of claim 10, wherein the first handle is supported on the first side of the body, and wherein the second handle is supported on a third side of the body.

12. The work light of claim 1, wherein the interface is positioned on a side of the body opposite to the first side.

13. A work light comprising:

a body including an interface configured to couple to a battery pack, the body having a first side and a second side;

a handle coupled to the first side;

a light panel pivotably coupled to the first side of the body and electrically coupled to the interface, the light panel pivotable toward the first side of the body to cover the handle;

a clamp assembly extendable from the second side of the body, the clamp assembly configured to selectively couple the work light to an external structure; and a magnet supported on the second side of the body.

* * * * *